United States Patent

Spencer et al.

[11] Patent Number: 6,046,797
[45] Date of Patent: Apr. 4, 2000

[54] OPTICAL TIME DOMAIN REFLECTOMETER AND METHOD

[75] Inventors: Geoffrey Spencer, Cape Town, South Africa; David Butler, Kent, United Kingdom

[73] Assignee: Alcatel, Paris, France

[21] Appl. No.: 08/945,254

[22] PCT Filed: Feb. 28, 1997

[86] PCT No.: PCT/GB97/00564

§ 371 Date: Jan. 9, 1998

§ 102(e) Date: Jan. 9, 1998

[87] PCT Pub. No.: WO97/32191

PCT Pub. Date: Sep. 4, 1997

[30] Foreign Application Priority Data

Feb. 29, 1996 [GB] United Kingdom ............... 9604322

[51] Int. Cl.[7] ............................................. G01N 21/00
[52] U.S. Cl. ............................................... 356/73.1
[58] Field of Search ........................ 356/73.1; 372/92; 250/227.16

[56] References Cited

U.S. PATENT DOCUMENTS

| | | | |
|---|---|---|---|
| 4,551,019 | 11/1985 | Vella et al. ........................ | 356/73.1 |
| 5,118,931 | 6/1992 | Udd et al. ........................ | 250/227.16 |
| 5,179,420 | 1/1993 | So et al. ........................... | 356/73.1 |
| 5,428,635 | 6/1995 | Zhiglinsky et al. ............... | 372/92 |

OTHER PUBLICATIONS

"Novel technique for monitoring long–haul undersea optical–amplifier systems" by R.A. Jensen et al., Conference on Optical Fiber Communications Technical Digest, 1994, pp. 256–257.

"Novel coherent hetrodyne optical time domain reflectometry for fault localization of optical amplifier submarine cable systems" by Y. Horiuchi et al., IEEE Photonics Technology Letters, vol. 2, No. 4, Apr. 1990.

Primary Examiner—Frank G. Font
Assistant Examiner—Tu T. Nguyen
Attorney, Agent, or Firm—Ware, Fressola, Van Der Sluys & Adolphson LLP

[57] ABSTRACT

An optical time domain reflectometer has an acoustic-optic modulator (30) for generating three different wavelengths, optical multipliers 40, 42 for alternating between one of the wavelengths ($\lambda_1$) and the other two wavelengths ($\lambda_1+\Delta\lambda$, $\lambda_1-\Delta\lambda$) in response to a signal generator 44, enables the provision of a test signal for transmission on an optical fiber transmission cable.

12 Claims, 3 Drawing Sheets

OPTICAL TIME DOMAIN REFLECTOMETER AND METHOD

BACKGROUND OF THE INVENTION

1. Technical Field

This invention relates to an optical time domain reflectomer (OTDR) and a method of fault or break detection by optical line domain reflectometry.

Optical communication systems are increasingly relying on the use of optical amplifiers to boost the optical signals so that communication at high bit rates over long ranges can be achieved. The cable and amplifiers for such systems are often located in inaccessible places, so a method of fault finding remotely from the ends of the system is required.

2. Description of the Prior Art

One method for measuring faults in fiber spans which has been used extensively is the optical time domain reflectometer. This injects an optical pulse into the fiber and then measures the relative magnitude and delay of the back scatter from the pulse as it propagates through the fiber. Generally optical amplifiers used in commercial applications include an optical isolator which prevents the back-scattered light from passing back through the amplifier. The isolator therefore precludes the use of this type of OTDR on fiber spans employing optical amplifiers.

Several methods have been proposed for fault location on a bidirectional optically amplified line e.g. R. Jensen, C. Davidson, D. Wilson and J. Lyons. "Novel Technique for Monitoring Long Haul Undersea Optical Amplifier Systems", Conference on Optical Fiber Communications 1994, Paper No. ThR3. The most convenient is the inclusion of cross couplers between the send and return amplifiers within a repeater as illustrated in FIG. 1. Note: Amplifiers A & C are an amplifier pair in one repeater, amplifiers B & C are an amplifier pair in the next repeater in the line.

Conventional OTDR's using an amplitude modulation pulse stream are not suitable for use in a system employing optical amplifiers since the amplifiers require a constant mean power with respect to the erbium fiber time constant. To overcome this it has been proposed by Y. Horiuchi, S. Ryu, K. Mochizuki and H. Wakabayashi, in "Novel Coherent Hetrodyne Optical Time Domain Reflectometry for Fault Localization of Optical Amplifier Submarine Cable Systems". IEEE Photonics Technology Letters, Vol 2, No. 4 (April 1990), that the pulses used are in the form of frequency shift keying (FSK) of an optical carrier (as in FSK RADAR).

Such systems suffer from degradation due to polarization effects and the present invention seeks to reduce the effect of polarization.

SUMMARY OF THE INVENTION

The present invention seeks to provide an improved optical time domain reflectometer.

According to the invention there is provided an optical time domain reflectometer comprising means for generating three different wavelengths and means for alternating between one of the wavelengths $\lambda_1$ and the other two wavelengths in response to a signal generator for providing a test signal for transmission on an optical fiber transmission cable. By employing a different wavelength for alternate signal portions, polarization reflection states would be different in each case so that polarization sensitivity is reduced.

The three different wavelengths may be derived from a common narrow linewidth laser source by means of one or more optical modulators responsive to an RF signal which is triggered to provide the alternation between one of the wavelengths being the narrow linewidth, and the other two wavelengths. In one embodiment of the invention, a single acousto-optical modulator is coupled to the laser source and is provided with oppositely disposed modulating inputs driven alternately from an RF generator in response to a pulse signal generator. The modulator may have individual outputs for the three wavelengths, which outputs are combined onto a single line by optical coupling means to provide the test signal for transmission.

In another embodiment first, second and third acousto-optical modulators may be provided, all optically coupled to the output of the laser source, the first and second of which modulators are coupled to an RF generator which provides a modulating signal, the third of which modulators is gated on and off to communicate the laser wavelength to an output line, and fourth and fifth acousto-optic modulators coupled between the output of first and second acousto-optic modulators respectively to an optical coupler which communicates to the output line. A complementary code generator is effective to provide a gating signal to the third acousto-optic modulator to gate "on" in the absence of a test signal transmission and "on" and "off" during a test signal transmission when it provides complementary gating signals to the fourth and fifth acousto-optical modulators to provide the test signal for transmission.

The reflectomer may comprise an optical receiver for receiving the test signal after reflection from the optical fiber transmission cable, the receiver being arranged to hetrodyne the received wavelengths with one of the wavelengths such that the difference frequency between that wavelength and the other returning wavelengths are detected; an envelope detector for the detected difference frequency signals; and a signal processor for determining the location of a break or fault in the transmission cable as a function of the time delay between transmitted and received test signals.

Alternatively, the reflectomer may comprise two optical receivers both coupled to receive the test signal after reflection from the optical fiber transmission cable, wherein one receiver is arranged to heterodyne the received wavelengths with a first one of the other two wavelengths and is routed via a low pass filter and envelope detector to a signal processor to provide an input indicative of the receipt of the first one of the wavelengths and the other receiver is arranged to heterodyne the received wavelengths with a second one of the other two wavelengths and is routed via another low pass filter and envelope detector to the signal processor such that the signal processor can distinguish between the received first and second wavelengths thereby to permit transmission and detection of a bipolar test signal. The test signal transmission may constitute a complimentary code e.g. Golay code and the signal processor may be adapted to detect that code.

In one advantageous embodiment the other two wavelengths are equidistantly displaced in frequency one above and one below the frequency of the one of the wavelengths.

According to another aspect of the invention there is provided a method of fault detection in an optical fiber transmission line comprising the steps of: generating three different wavelengths; transmitting an outgoing signal which comprises a first one of the wavelengths in the absence of a test signal and a digital test signal which alternates between the first wavelength and a second and third wavelength to provide the test signal; receiving and detecting the test signal after reflection from a fault or break on the line; and determining the location of the fault or break as a function of the time delay between transmission and receipt of the test signal.

The invention will be fully understood when reference is made to the following detailed description taken in conjunction with the accompanying drawing.

BRIEF DESCRIPTION OF THE DRAWING

In order that the inventions and its various other preferred features may be understood more easily, some embodiments thereof will now be described by way of example only with reference to the drawing, in which.

DETAILED DESCRIPTION OF THE INVENTION

Figure 1:
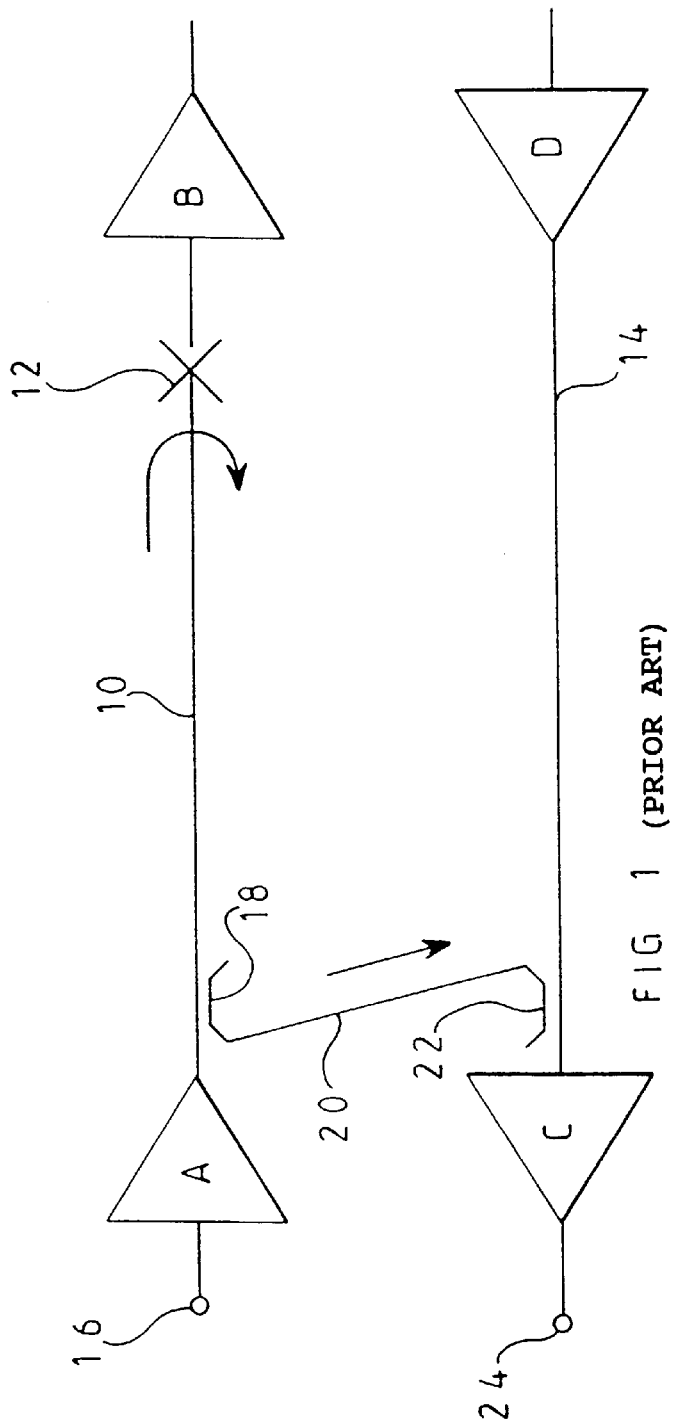
FIG. 1 illustrates schematically a conventional system which permits optical time domain reflectometers to be employed in an optically amplified system for detection of breaks.

In FIG. 1, an outgoing optical fiber line 10 for transmission of traffic has a pair of amplifiers A & B and is illustrated to have a break 12. A return optical fiber line 14 for receipt of traffic has a pair of optical amplifiers D & C. An OTDR transmission (not shown) is coupled to input 16 so as to launch a pulse onto the line 10. The pulse is reflected or backscattered from the break 12 and is coupled via optical couplers 18, line 20 and optical coupler 22 across to the return line 14 and is amplified by the amplifier C before passing out of the output 24 of the return line to an OTDR receiver. The present invention is useable in such a system.

Figure 3:
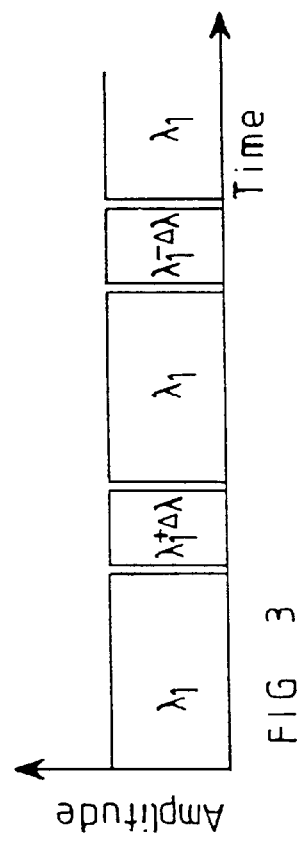
FIG. 3 is a waveform amplitude/time diagram to illustrate the signals generated by the OTDR of FIG. 2.
Figure 2:
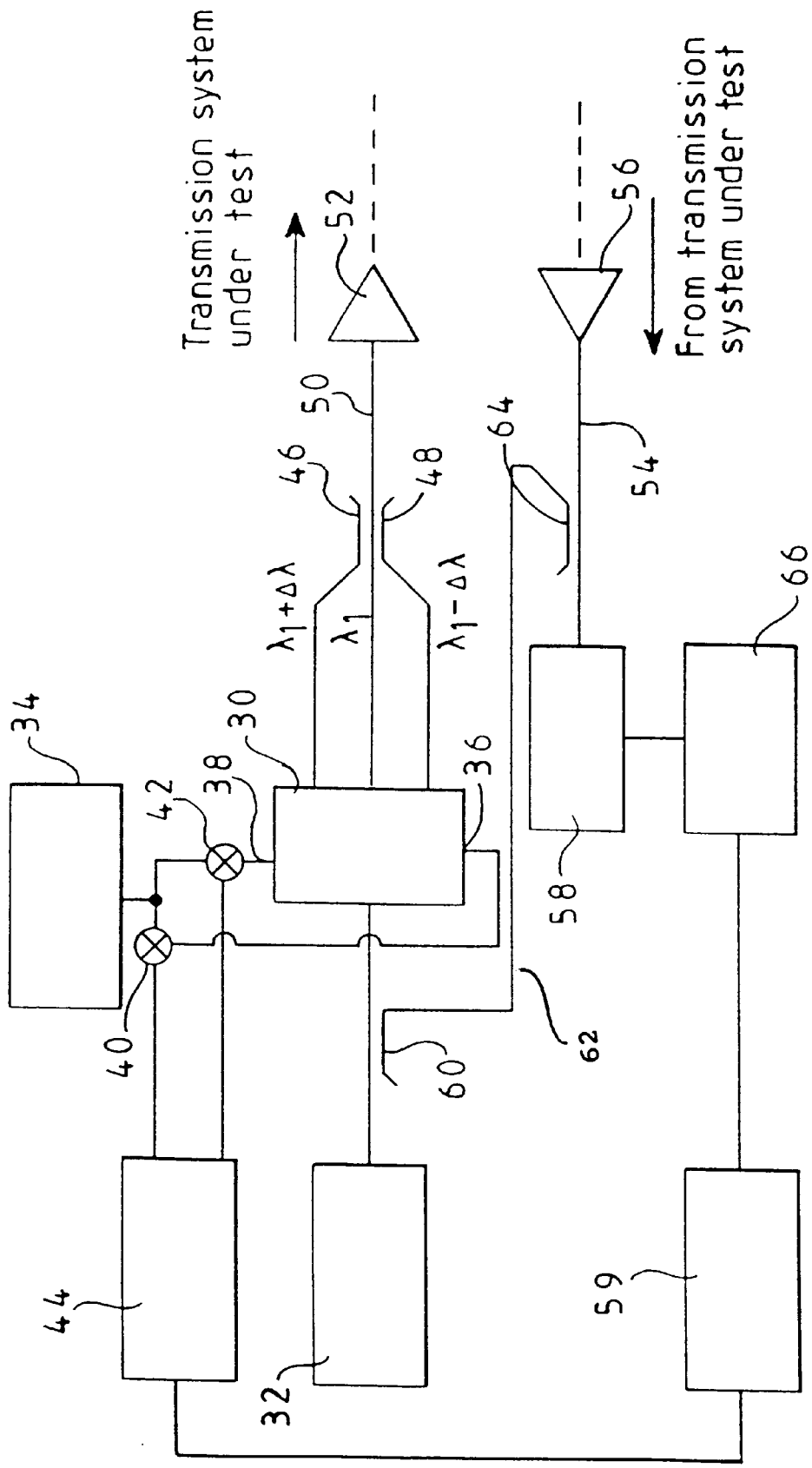
FIG. 2 is a block schematic diagram of an OTDR constructed in accordance with the invention and suitable for use in the system of FIG. 1.

Referring now to FIG. 2, there is shown an acousto-optic modulator 30 for example a Bragg cell which is employed to generate three wavelengths from a single narrow linewidth laser source 32, e.g. a distributed feedback laser or an external cavity laser. A suitable laser wavelength is 1550 nm. An RF generator 34 (also known as an oscillator) having a frequency of e.g. 50 MHz is coupled to oppositely disposed modulator inputs 36, 38 via individual optical multiplier or optical switches 40, 42 (also known as a mixer). The multipliers 40, 42 are each coupled to a different outputs of a pulse generator 44 which outputs are arranged both to provide a logic 0 out in a quiescent state and to provide complementary pulses when in operation to generate a test signal. In the quiescent state a logic 0 applied to each of the multipliers prevents passage of the RF drive frequency to the inputs 36 and 38 of the modulator 30. When the pulse generator 44 is in operation it provides complementary switching pulses to the multipliers 40, 42 so that the RF drive is alternately switched between the inputs 36 and 38 in response to generator pulses such that the modulator 30 produces the waveform illustrated in FIG. 3 where $\lambda_1$ is the wavelength of the laser 32 and $\Delta\lambda$ is the wavelength equivalent of the 50 MHz RF generator 34. The pulses $\lambda_1+\Delta\lambda$ and $\lambda_1-\Delta\lambda$ may or may not be the same amplitude as the signal $\lambda_1$. The acousto-optic modulator 30 has three outputs one for $\lambda_1$ one for $\lambda_1/+\Delta\lambda$ and one for $\lambda_1/-\Delta\lambda$. The outputs for wavelengths $\lambda_1+\Delta\lambda$ and $\lambda_1-\Delta\lambda$ are each coupled via optical couplers 46, 48 to an output line 50 for the wavelength $\lambda 1$ and the output line 50 is connected via an amplifier 52 to a transmission system under test. A return line 54 from an amplifier 56 is coupled to the input of an optical receiver 58 and receives the reflected OTDR signals. The output of the laser 32 at wavelength $\lambda_1$ is coupled via optical coupler 60, optical fiber 62 and optical coupler 64 to the return line 54 and into the receiver 58. The receiver 58 heterodynes $\lambda_1$ with the returning signal on line 54 and produces a common difference frequency of wavelength $\Delta\lambda$ (50MHz) from both wavelengths $\lambda_1+\Delta\lambda$ and $\lambda_1-\Delta\lambda$ and this permits the generation of a common frequency for each test pulse. This is then passed through a bandcase filter and envelope detector circuit 66 to a signal process 59. The signal processor 59 also receives pulses from the pulse generator 44 and compares the time delay between transmission and reception of test pulses and determines the location of the break as a function of the time delay.

The arrangement of FIG. 2 is advantageous in that a single laser is employed to generate three wavelengths. The use of three wavelengths has a beneficial effect in reducing the effect of polarization sensitivity which results in reduction of dynamic range of the systems. However, the arrangement does not permit distinction between the two return pulse wavelengths, as they both have the same frequency after heterodyning, and this prevents the use of bipolar complementary coding.

Figure 4:
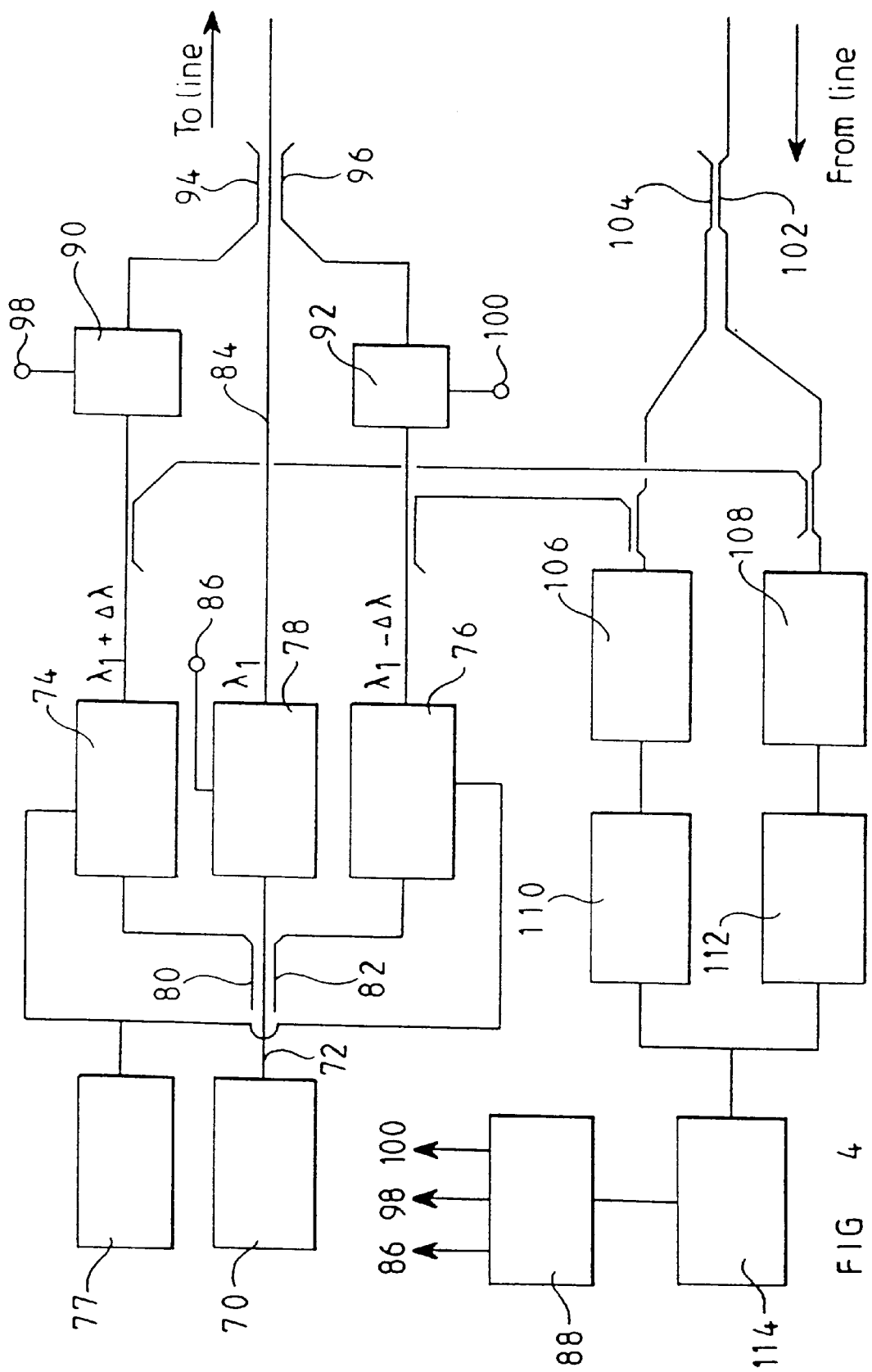
FIG. 4 is a block schematic diagram of an alternative OTDR constructed in accordance with the invention.

FIG. 4 illustrates an alternative OTDR which permits distinction of a bipolar complementary coded test signal. In this arrangement a narrow linewidth laser source 70 of wavelength $\lambda_1$ has an output line 72. First, second and third acousto-optical modulators 74, 76 and 78 respectively are optically coupled to the line 72. The first and second modulators are coupled to the line 72 via optical couplers 80, 82. The first and second modulators 74, 76 are each coupled to an RF generator 77 of e.g. 50 MHz so as to provide a wavelength at their outputs of $\lambda_1+\Delta\lambda$ & $\lambda_1-\Delta\lambda$ respectively. The third modulator 78 has an output to a line 84 to a system under test and has a gating input 86 which receives an output from a complementary code generator 88 which is effective to gate the modulator 78 on and off to communicate the laser wavelength $\lambda_1$ to the output line 84. Fourth and fifth acousto-optic modulators 90, 92 are coupled between the output of first and third acousto-optic modulators 74, 76 respectively and to an optical coupler 94, 96 which communicates to the output line 84. The complimentary code generator 88 has two further outputs coupled one to each of the modulators 90, 92 via gating inputs 98, 100. The complementary code generator 88 is effective to provide a gating signal to the third modulator 78 to gate on in the absence of a test signal transmission and on and off during a test signal transmission when it provides complementary gating signals to the fourth and fifth modulators 90, 92 so as to provide on the output line 84 a signal which alternates between wavelength $\lambda_1$ and $\lambda_1+\Delta\lambda$ and $\lambda_1-\Delta\lambda$.

The receiving path 102 from the line is split via an optical coupler 104 into two paths one to each of two optical receivers 106, 108 so that they receive the test signals after reflection from the fault in the optical fiber transmission cables. The input to one of the receivers 106 is coupled to the output of modulator 76 and receives the additional wavelength $\lambda_1+\Delta\lambda$ whilst the input to the receiver 108 is coupled to the output of modulator 74 and receives the additional wavelength $\lambda_1+\Delta\lambda$. These additional wavelengths heterodyned with the received wavelengths and are routed via a low pass filter and envelop detector 110 or 112 to a signal processor 114. Accordingly the signal processor 114 can distinguish between the received first and second wavelengths. This permits the transmission and detection of a bipolar test signal which can be transmitted in complementary code pairs such as a Golay code. Employment of Complementary coding results in increased sensitivity of detection and hence dynamic range.

The preferred embodiment described above admirably achieves the objects of the invention. However, it will be appreciated that departures can be made by those skilled in the art without departing from the spirit and scope of the invention which is limited only by the following claims.

What is claimed is:

1. An optical time domain reflectometer comprising:

means for generating three different wavelengths ($\lambda_1$, $\lambda_1+\Delta\lambda$, $\lambda_1-\Delta\lambda$);

means for alternating between one of the wavelengths ($\lambda_1$) and the other two wavelengths ($\lambda_1+\Delta\lambda$, $\lambda_1-\Delta\lambda$) in response to a pulse generator signal from a signal generator, for providing a test signal for transmission on an optical fiber transmission cable; and means for heterodyning the test signal after reflecting from the optical transmission cable with one of the three different wavelengths ($\lambda_1$, $\lambda_1+\Delta\lambda$, $\lambda_1-\Delta\lambda$).

2. An optical time domain reflectometer as recited in claim 1, wherein the three different wavelengths are derived from a common narrow linewidth laser source by means of one or more optical modulators responsive to an RF signal which is triggered to provide the alternation between one of the wavelengths ($\lambda_1$) that is a narrow linewidth, and the other two wavelengths ($\lambda_1+\Delta\lambda$, $\lambda_1-\Delta\lambda$).

3. An optical time domain reflectometer as recited in claim 2, wherein a single acousto-optical modulator is coupled to the common narrow linewidth laser source and is provided with oppositely disposed modulating inputs driven alternately from an RF generator in response to the signal generator.

4. An optical time domain reflectometer as recited in claim 3, wherein the single-acoustic optical modulator has individual outputs for the three different wavelengths ($\lambda_1$, $\lambda_1+\Delta\lambda$, $\lambda_1-\Delta\lambda$), which outputs are combined onto a single line by optical coupling means to provide the test signal for transmission.

5. An optical time domain reflectometer as recited in claim 2, further comprising:

first, second and third acousto-optical modulators, all optically coupled to an output of the common narrow linewidth laser source, the first and second acoustic-optical modulators are coupled to an RF generator which provides a modulating signal, the third acoustic-optical modulator is gated on and off to communicate a laser wavelength to an output line; and fourth and fifth acousto-optic modulators coupled between an output of the first and second acoustic-optic modulators respectively to an optical coupler which communicates to the output line;

wherein a complementary code generator is effective to provide a gating signal to the third acousto-optic modulator to gate on in the absence of a test signal transmission and to gate on and off during the test signal transmission when to provide complementary gating signals to the fourth and fifth acousto-optical modulators to transmit the test signal transmission.

6. An optical time domain reflectometer as recited in claim 2, wherein the single-acoustic optical modulator has individual outputs for the three different wavelengths, which outputs are combined onto a single line by optical coupling means to provide the test signal for transmission.

7. An optical time domain reflectometer as recited in claim 1, comprising:

an optical receiver coupled with an envelope detector, the optical receiver being arranged for receiving the test signal after reflection from the optical fiber transmission cable, wherein the optical receiver is arranged to heterodyne the received wavelengths with said one of the wavelengths such that the difference frequency between that wavelength and the other returning wavelengths are coupled to the envelope detector for detecting difference frequency signals; and a signal processor for determining the location of a break or fault in the optical fiber transmission cable as a function of the time delay between transmitted and received test signals.

8. An optical time domain reflectometer as recited in claim 7, wherein the test signal transmission constitutes a complimentary code and the signal processor may be adapted to detect the complimentary code.

9. An optical time domain reflectometer as recited in claim 8, wherein said other two wavelengths are adequately displaced in frequency one above and one below the frequency of said one of the three different wavelengths ($\lambda_1$, $\lambda_1+\Delta\lambda$, $\lambda_1-\Delta\lambda$).

10. An optical time domain reflectometer as recited in claim 1, wherein said other two wavelengths are adequately displaced in frequency one above and one below the frequency of said one of the three different wavelengths.

11. A method of fault detection in an optical fiber transmission line comprising the steps of:

generating three different wavelengths, transmitting an outgoing signal which comprises a first one of the three different wavelengths in the absence of a test signal and a digital test signal which alternates between the first one of the three different wavelengths and a second and third wavelength to provide the test signal, receiving and detecting the test signal after reflection from a fault or break on the optical transmission line, heterodyning a received test signal with one of the three different wavelengths, and determining the location of the fault or break as a function of the time delay between transmission and receipt of the test signal.

12. An optical time domain reflectometer comprising:

means for generating three different wavelengths ($\lambda_1$, $\lambda_1+\Delta\lambda$, $\lambda_1-\Delta\lambda$);

means for alternating between one of the wavelengths $\lambda_1$ and the other two wavelengths ($\lambda_1+\Delta\lambda$, $\lambda_1-\Delta\lambda$) in response to a pulse generator signal from a signal generator, for providing a test signal for transmission on an optical fiber transmission cable; and two optical receivers both coupled to receive the test signal after reflection from the optical fiber transmission cable, wherein one receiver is arranged to heterodyne the received wavelengths with a first one of said other two wavelengths ($\lambda_1-\Delta\lambda$) and is routed via a low pass filter and envelope detector to a signal processor to provide an input indicative of the receipt of the first one of the wavelengths and the other receiver is arranged to heterodyne the received wavelengths with a second one of said other two wavelengths ($\lambda_1+\Delta\lambda$) and is routed via another low pass filter and envelope detector to the signal processor such that the signal processor can distinguish between the received first and second wavelengths thereby to permit transmission and detection of a bipolar test signal.

\* \* \* \* \*